Aug. 22, 1939.   P. S. DICKEY   2,170,344
CONTROL SYSTEM
Original Filed Dec. 18, 1935   5 Sheets-Sheet 1

INVENTOR
PAUL S. DICKEY
BY
Raymond W. Junkins
ATTORNEY

Aug. 22, 1939.   P. S. DICKEY   2,170,344
CONTROL SYSTEM
Original Filed Dec. 18, 1935   5 Sheets-Sheet 4

INVENTOR.
PAUL S. DICKEY
BY
ATTORNEY.

INVENTOR.
PAUL S. DICKEY

Patented Aug. 22, 1939

2,170,344

UNITED STATES PATENT OFFICE 2,170,344

CONTROL SYSTEM

Paul S. Dickey, Cleveland, Ohio, assignor to Bailey Meter Company, a corporation of Delaware Application December 18, 1935, Serial No. 55,022
Renewed December 22, 1938

23 Claims. (Cl. 122—448)

This invention relates to a method and means for operating and controlling the operation of vapor generators; particularly vapor generators of the drumless, forced flow type, having a fluid flow path including one or more long small-bore tubes, in which the flow in the path is initiated by the entrance of liquid under pressure at one end, and the exit of vapor only at the other end; characterized by an inflow of liquid normally greater than the outflow of vapor, the difference being diverted from the path intermediate the ends thereof.

Such a vapor generator having small liquid storage and operated with wide range combustion devices forms a combination rendering practical extremely high heat release rates with the consequent ability to economically handle practically instantaneous load changes from minimum to maximum, and vice versa, without heavy standby expense, and is particularly suitable for operating conditions such as locomotive service, where load variations are of a wide range and are required to be met substantially instantaneously.

The generator has a minimum liquid storage capacity with a maximum heat absorbing surface so disposed and arranged as to be substantially instantaneously responsive to rapid changes and wide diversities in heat release rate in the furnace. The heat absorbing surface is arranged in relation to the path of the products of combustion and radiant heating so that the entering liquid is received at the cooler end of the path. Further, the vapor generator insofar as the passage of combustion gases is concerned has a continuously increasing resistance to gas flow throughout the length of the passage.

The heat absorbing surface, or flow path for the working medium, is comprised of one or more long small-bore tubes with an enlargement, preferably at the end of the generating section, which acts as a separator to divide liquid and vapor. The vapor is then passed through a superheater, while the excess liquid carried through the tubes for the purpose of wetness and preventing scale deposit, is diverted out of the separator under regulated conditions, as will be hereinafter set forth. From the separator there is a normal continuous and an additional regulated spillover or diversion of a part of the liquid entering the economizer under pressure, so that there is always being fed to and through the economizer and vapor generating sections more liquid than can be converted into vapor in a single passage therethrough, although the proportion of such excess liquid represents but a small part of the total volume of fluid passing through the vapor generator and is at most times only sufficient to insure tube wetness and to carry off scale forming material.

In vapor generators of the character mentioned having small liquid and heat storage with high heat release capabilities, the liquid inflow must of necessity be continuous and at all times proportioned to the vapor outflow, at the same time taking into account the desired diversion of excess liquid from the flow path. Furthermore to accomplish the wide range in heat release with substantially instantaneous response and to perform the combustion process efficiently, a method and means for operating such a vapor generator in accordance with varying conditions must be provided.

A principal object of the invention is to so control the operation of such a vapor generator as to satisfactorily produce wide changes in heat release rate with great speed, through proper regulation of liquid inflow and of the elements of combustion.

A further object is to maintain the efficiency of combustion uniformly high, regardless of sudden and wide variations in rating.

Further objects will become evident from a study of the specification and of the drawings, in which:

Fig. 1 diagrammatically illustrates a drumless forced flow vapor generator to which the present invention is directed.

Fig. 2 diagrammatically illustrates a drumless forced flow vapor generator, combined with the requisite apparatus to control the functioning thereof, and such apparatus shown in partially diagrammatic fashion.

In the drawings identical parts bear the same reference numerals.

Figure 1:
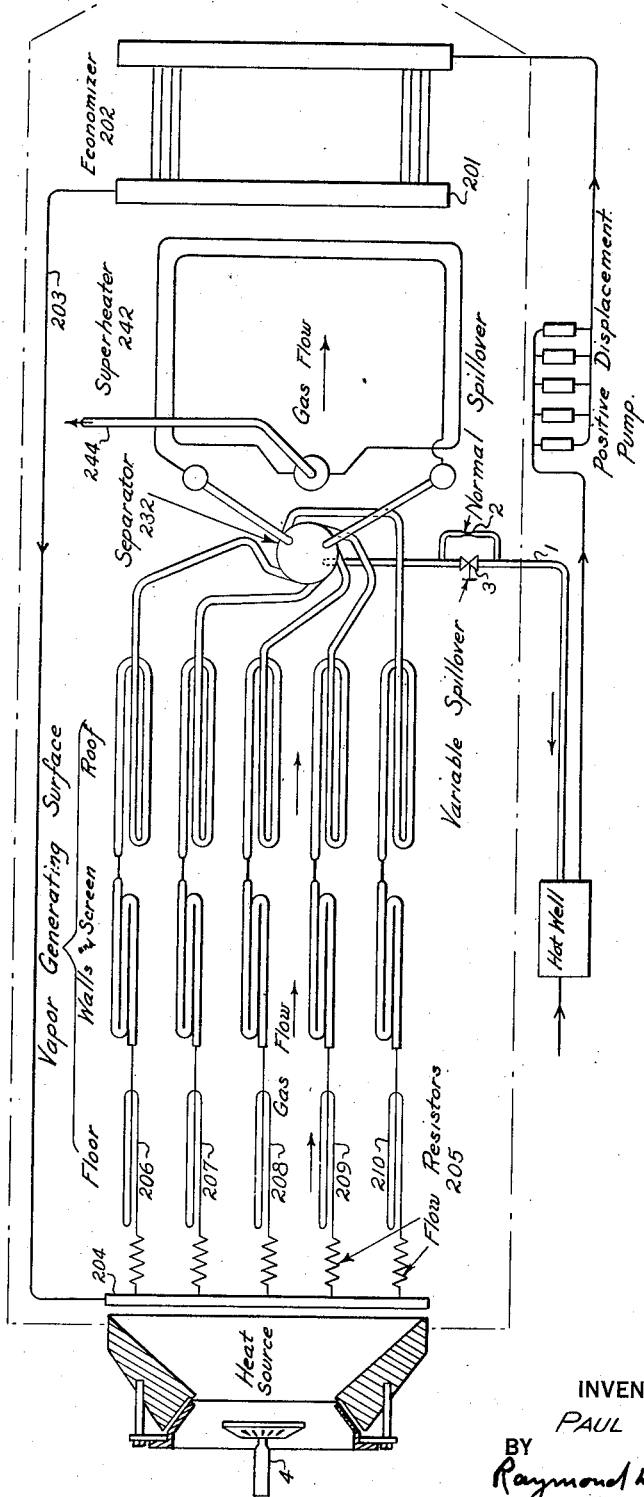

The drumless forced flow vapor generator to which the present invention is directed is diagrammatically illustrated in Fig. 1 to indicate gas flow, working fluid flow, and heat absorbing surface arranged as contained within the enclosure represented by the dot and dash lines.

The flow path for the working medium is comprised of long small-bore tubes brought together at suitable headers. The generator includes an economizer 202 at the cooler end of the gas passage and which receives liquid from a positive displacement pump as shown connected to the hot well.

The liquid from the economizer outlet header 201 is conveyed by a tube 203 to a manifold tube 204 from which the liquid is distributed to the generating section through, in this instance, five fluid flow resistors 205, each of which has a greater resistance drop than the particular fluid flow passage which it serves and whereby the liquid is proportionately distributed to each of the tubular fluid flow passages 206, 207, 208, 209 and 210 constituting the generating section of the assembly, which comprises floor, wall, screen and roof portions as indicated.

These five flow circuits comprising the vapor generating surface tangentially enter a bulge in the fluid flow path which is in the form of a separating chamber 232 for dividing the fluid into liquid and vapor; the vapor passing to a superheater 242, and the excess liquid being diverted from the fluid flow path through a pipe I to the hot well or to waste. A normal continuous spillover occurs through the restriction 2 while a variable spillover occurs through the regulating valve 3.

The "heat source" (Fig. 1) includes an oil burner 4 supplied by a pipe 5 (Fig. 2) and an air chamber 6 supplied by a conduit 7. In order to provide for initial ignition of the oil-firing means, a gas-firing device 8 is supplied by a pipe 9 with a flow of gas under the control of a solenoid actuated valve 10.

Figure 2:
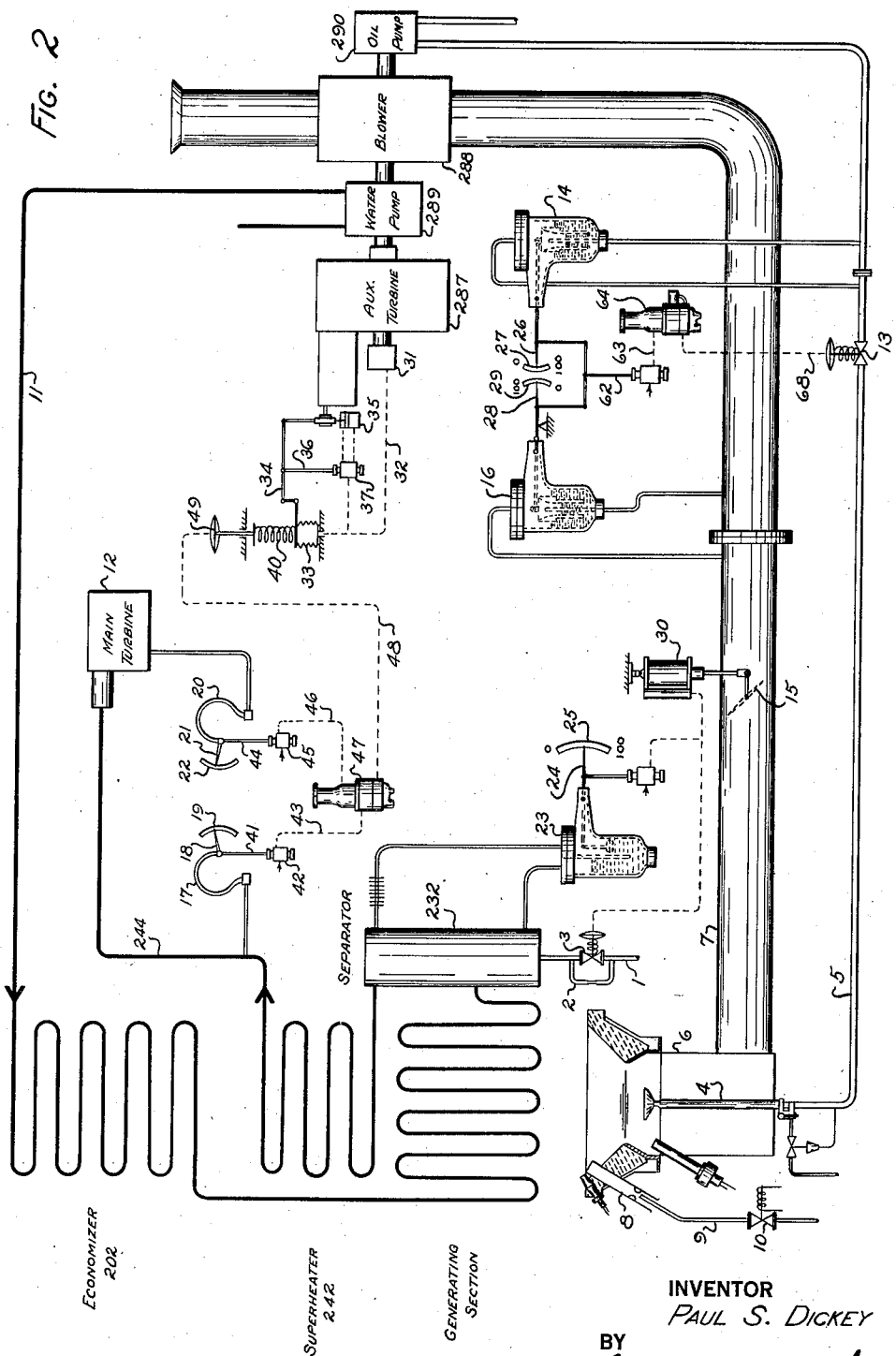

Referring now in particular to Fig. 2, I illustrate the fluid flow path as a single sinuous tube, to the economizer section 202 of which, liquid is supplied under pressure through a pipe 11 from a pump 289, which while it is illustrated in Fig. 1 as a positive displacement pump may be of any suitable type, and which I have therefore illustrated in Fig. 2 merely diagrammatically. From the economizer section the fluid passes to and through the generating section discharging into the separator 232. From the separator, vapor passes to and through the superheater 242, leaving by the conduit 244 to a main turbine 12 illustrative of a vapor consuming device. Products of combustion pass successively through the generating section, superheater, and economizer and may contact a part or all of the separator.

An auxiliary turbine 287 drives the liquid feed pump 289, the air blower 288, and the fuel supply pump 290. While I have illustrated these devices diagrammatically and as though all are located to be driven by the same shaft and at the same speed, it will be understood that the necessary gear reduction, or driving connections between the several devices, are known and would be properly designed as to relative speed, power, etc., and that I merely intend to indicate that the auxiliary turbine 287 drives the devices 289, 288, and 290 simultaneously and in unison.

The rate of supply of fuel oil to the burner 4 is primarily controlled by the speed of the oil pump 290, but the supply of oil is further regulated by the throttling of a regulating valve 13 located in the pipe 5; and the rate of flow is continuously measured by a meter 14.

The rate of supply of air to support combustion is primarily determined by the speed of the blower 288 but is further under the control of a damper 15 positioned in the conduit 7 between the blower 288 and the air chamber 6. The rate of supply of air is continuously measured by a flow meter 16.

The rate of supply of liquid under pressure through the conduit 11 is controlled by the speed of the pump 289 in turn under the control of variables in the operation of the system.

In the operation of such a vapor generator certain variables are measured, indicated, and utilized as the basis for automatically controlling the supply of liquid thereto and the supply of the elements of combustion to the heating furnace.

I indicate at 17 a pressure responsive device such as a Bourdon tube connected to the conduit 244 and having an indicator pointer 18 adapted to cooperate with an index 19 for advising the instantaneous value of the vapor outflow pressure.

As an indicator of output, or load upon the vapor generator, I provide a Bourdon tube 20 adapted to position an indicator pointer 21 relative to an index 22. The Bourdon tube 20 is connected by means of a pipe with the turbine 12 at a location such that the Bourdon tube will be sensitive to first stage shell pressure of the turbine, which pressure bears a substantially straight line relation to rate of steam flow. Thus the pointer 21 will indicate, relative to the scale 22, a reading representative of rate of flow of steam from the vapor generator and therefore an indication of output or load upon the generator.

23 represents means responsive to liquid level within the separator 232 which constitutes a pressure casing enclosing a mercury U-tube connected across the vertical elevation of the separator. A float is adapted to rise and fall with the surface of the mercury in one leg and to thus cause a positioning of a pointer 24 relative to an index 25 to advise the instantaneous value of liquid level within the separator.

The flow meter indicated in general at 14 for providing a measure of the rate of supply of fuel to the furnace is of a type such as is disclosed in the patent to Ledoux, No. 1,064,748. Such a meter is a differential pressure responsive device adapted to correct for non-linear relation between differential pressure and rate of flow, to the end that angular positioning of a pointer 26 relative to an index 27 is by increments directly proportional to increments of rate of flow. I illustrate by dotted lines within the flow meter 14 the outline of the internal construction wherein is a liquid sealed bell having walls of material thickness and shaped as described and claimed in the above mentioned Ledoux patent.

The flow meter 16 for measuring the rate of supply of air for combustion is similar to the meter 14 and positions a pointer 28 relative to an index 29 to provide a continuous indication of the instantaneous rate of flow of air to the furnace.

I preferably primarily control the supply of liquid to the fluid flow path and the elements of combustion to the furnace, through variation in speed of the auxiliary turbine, utilizing the vapor outflow pressure and the turbine shell pressure as a basis for such control. Realizing, however, the possible difference in characteristics of the pumps and blower, as well as variations in conditions of operation, I provide readjusting means to supplement the primary control of the elements of combustion. For the air, such readjusting means comprises the damper 15 positioned at the outlet of the blower 288 by a pneumatic actuator 30. For the fuel, the readjusting means comprises the regulating valve 13 positioned in the pipe 5 responsive to departure from desired relation of the measure of fuel flow and the measure of air flow.

The auxiliary turbine is normally supplied with exhaust steam from the main turbine or with steam bled from an intermediate stage of the main turbine. It is primarily desirable to vary the speed of the auxiliary turbine in step with the main turbine so as to roughly proportion liquid and the elements of combustion to the vapor generator according to load on the vapor generator; then to individually readjust the supplying of liquid and fuel and air according to variables or characteristics in the operation of the power plant.

If vapor were supplied to the auxiliary turbine at a relatively constant pressure, as for example direct from the vapor generator, then the principal duty of the governing mechanism of the auxiliary turbine would be to vary the opening of the admission valves in step with main turbine operation. However when the auxiliary turbine is using extraction or exhaust steam from the main turbine; if the load on the main turbine falls off, then the pressure of the vapor available to the auxiliary turbine falls off more rapidly than the requirements of the auxiliary turbine so far as work is concerned, and it would probably be necessary for the valves to be gradually opened as the load is reduced, and even at a certain low load there may be insufficient vapor from this source, and a high pressure valve may have to be opened to supplement the supply of extraction or exhaust vapor.

The auxiliary turbine admission valves cannot then be directly geared to a function of main turbine operation or vapor generator load unless the vapor supply to the auxiliary turbine is at a relatively constant pressure as from the vapor generator. I do, however, desire the auxiliary turbine to operate at a speed roughly in step with the main turbine speed.

To determine the speed of the auxiliary turbine I preferably provide a pump, compressor or similar device 31 driven by and with the auxiliary turbine to establish a fluid pressure (such as an oil pressure) bearing a known relation to speed. I then utilize this oil pressure in a governing mechanism normally tending to hold the speed of the auxiliary turbine constant regardless of pressure of vapor supplied it. I then load up the oil pressure responsive device according to variations in vapor generator and main turbine operation, thus furnishing the speed requirements that the variable speed governor of the auxiliary turbine must work to.

Oil from the pump 31 passes through a pipe 32 to an expansible metallic bellows 33, adapted to position one end of a floating link 34. The other end of the link 34 is moved by and with a power piston traveling in a cylinder 35 and adapted to move the vapor admission valves of the auxiliary turbine. A pilot stem 36 is suspended from the link 34 intermediate the ends thereof and controls the flow of oil under pressure through a pilot casing 37 to opposite sides of the piston 35.

Figure 4:
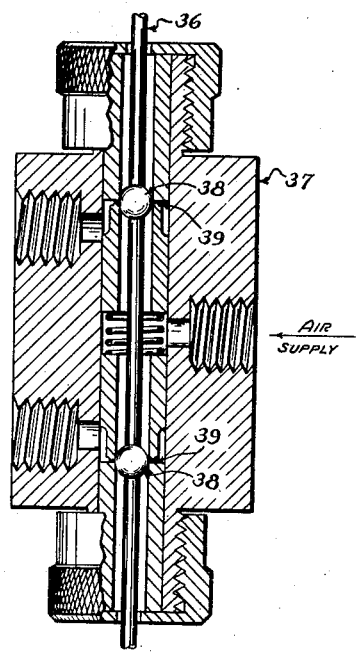
Fig. 4 is a sectional elevation of a pilot valve.

A pilot valve such as that indicated at 37 is shown in detail in Fig. 4 and forms the subject matter of the patent to Clarence Johnson, No. 2,054,464.

Fluid under pressure is supplied to the interior of the casing 37 intermediate the pilot lands 38, which lands are so spaced along the stem 36 as to coincide with narrow annular ports 39. When the pilot stem is axially moved in the casing so that the lands 38 are moved relative to the ports 39, then a definite loading pressure is available in the annular ports bearing a known relation to the amount of such movement. For example, if the stem 36 is moved upwardly there is available at the upper left-hand exit of the casing (Fig. 4) a loading pressure increasing in definite relation to such movement, while if the stem 36 is moved downwardly there is available at the lower left-hand exit a pressure increasing definitely with such movement.

Assuming a fixed loading on the governor spring 40 at the upper end thereof, then if the load on the main turbine decreases, causing a decrease in pressure of bleed or exhaust vapor available to the auxiliary turbine, the speed of the auxiliary turbine will decrease causing a decrease in pressure of oil available at the bellows 33 and a lowering of the left-hand end of the link 34 with a corresponding downward movement of the pilot 36. Such movement will decrease the pressure above the piston and increase the pressure below the piston 35, causing the piston to move upwardly and reposition the pilot 36 to its predetermined location. Upward movement of piston 35 will open the admission valves and thereby tend to return the speed of the auxiliary turbine to its previous value.

As previously mentioned I desirably load the governor spring 40 in amount depending upon the rate of operation of the vapor generator and of the main turbine. As an indication of the load on the main turbine, I preferably use a measure of the vapor supplied thereto, and as a measure of the heat level of the vapor generator I use an indication of vapor outflow pressure at the exit of the superheater. I have found that turbine shell pressure bears a straight line relation to rate of flow. Preferably I utilize first stage pressure, although the pressure at any other stage might be taken.

Certain features relating to turbine shell pressure control, herein disclosed but not claimed, form the subject matter of the copending application of Ralph M. Hardgrove, Serial No. 55,027, filed of even date herewith.

Pressure effective upon the Bourdon tube 17 positions a pilot stem 41 within a pilot casing 42 to establish an air loading pressure in a pipe 43 representative of the pressure of the vapor in the conduit 244. Likewise the Bourdon tube 20 positions a pilot stem 44 relative to a pilot casing 45 to establish an air loading pressure in the pipe 46 representative of the turbine shell pressure. The two loading pressures are effective at a differential relay 47, from which an air loading pressure algebraically resultant of the pressures in the pipes 43, 46 is effective through a pipe 48 upon a diaphragm 49 for loading the spring 40.

Figure 5:
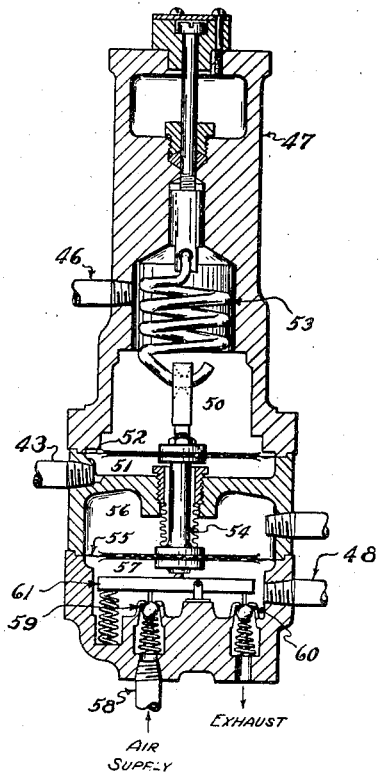
Fig. 5 is a sectional elevation of a pneumatic relay.

Referring to Fig. 5 the connection 46 leads to a chamber 50, separated by a diaphragm or movable partition 52 from a chamber 51 to which is connected the pipe 43. The diaphragm 52 and its loading spring 53 are both connected to a stem 54, to which is also attached a diaphragm 55 separating the chambers 56, 57. Chamber 56 is open to the atmosphere. A supply of air under pressure is available through the connection 58 to the chamber 57 under the control of a valve 59. Exhaust from the chamber 57 to the atmosphere is under the control of a valve 60. The stem 54 is adapted to position a valve actuator 61 to either admit air under pressure through the valve 59, thus increasing the pressure within the chamber 57, or to bleed air to the atmosphere through the valve 60 and thus decrease the pressure within the chamber 57. Pressure within the chamber 57 is transmitted through a connection 48 to be effective upon diaphragm 49. It will be observed that variations in the pressure effective through the connection 46 and/or that effective through the connection 43, will be effective to vary the air pressure within the chamber 57 and correspondingly the air pressure for positioning the diaphragm 49. Certain features of the differential relay 47 are disclosed and claimed in my Patent 2,098,913.

In loading the governor spring 40 I preferably let the effect from turbine shell pressure predominate. This may be done by shaping the pilot land 38 (in casing 42) positioned from vapor outflow pressure to have a longer and slower slope and requiring greater movement per pound air pressure change and correspondingly a lesser change in air loading pressure for a given change in vapor pressure, as compared to the pilot land 38 in casing 45 (positioned from turbine shell pressure) having a relatively steeper inclination and correspondingly a greater change in air loading pressure for a given change in turbine shell pressure. I might accomplish similar results by introducing throttling restrictions in either of the lines 43, 46 to make one effect more sensitive than the other for equal movements of the Bourdon tubes 17, 20.

The apparatus may be adjusted so that full variation from minimum to maximum load may cause sufficient change in air loading pressure to operate the auxiliary turbine over the speed range corresponding to the load variation, or to accomplish desired auxiliary turbine speed variations corresponding to definite vapor outflow pressure variations.

In prior controls for vapor generators, the primary control for liquid inflow and the elements of combustion (in the present case the speed of the auxiliary turbine) has been from outflow pressure as an indication of heat level in the vapor generator. However with the extremely rapid load changes and small heat and liquid storage of the present vapor generator, with the necessity for automatic operation throughout all ranges in rating, it becomes essential that a system such as that just described be used. The ratio control between auxiliary turbine speed (indicated by oil pressure) and main turbine shell pressure, is advantageous since approximately the correct change in auxiliary turbine speed is made immediately upon load change instead of waiting until vapor outflow pressure changes take place. The sensitivity of the vapor outflow pressure control is reduced and the regulation is smoother with smaller overall variations in vapor pressure than could possibly be the case with only a single element control from the vapor outflow pressure.

Figure 6:
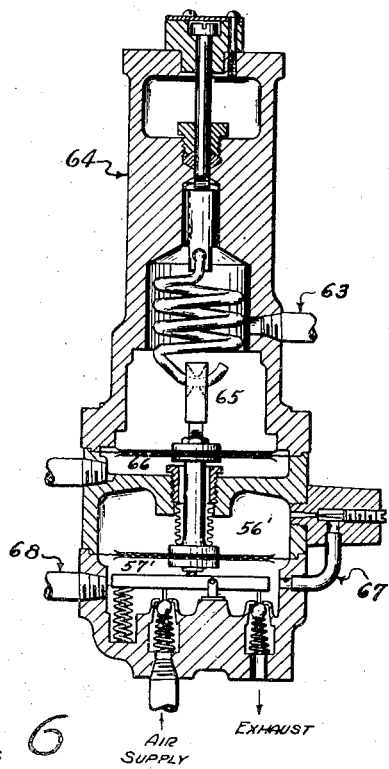
Fig. 6 is similar to Fig. 5 but embodies certain additional features of construction.

Secondary control of the supply of oil to the burner 4 is accomplished from the fuel-air ratio apparatus. The flow meters 14, 16 are interconnected in such a manner that should the rate of supply of fuel oil and the rate of supply of air for combustion to the furnace deviate from the desired ratio, vertical positioning of a pilot stem 62 occurs for varying a loading pressure effective through a pipe 63 to the chamber 65 of a standardizing relay 64. Referring now to Fig. 6 it will be observed that the standardizing relay 64 is to a certain extent similar to the relay 47, with the addition of a controllable bleed connection 67 between the chambers 56' and 57'. The chamber 66 is open to the atmosphere.

Certain features of the construction are disclosed and claimed in the patent to Harvard H. Gorrie, No. 2,098,914. A loading pressure established within chamber 57' is effective through the connection 68 upon the diaphragm valve 13 for positioning the same. In this instance the function of the controllable bleed connection 67 is to supplement the primary control of the pressure effective upon the actuator 13 with a secondary control of the same or different magnitude as a follow-up or supplemental action to prevent overtravel and hunting and wherein the positioning of the valve 13 will not necessarily be directly with the positioning of the pilot 62.

Throughout the drawings I indicate pipes or capillaries for transmitting air or oil control pressures by dotted lines to distinguish from electrical connections or other pipes or conduits.

A supplemental or secondary control of the air supplied to the furnace through the conduit 7 is accomplished by the positioning in the conduit of the damper 15. This damper, as well as the adjustable valve 3 in the diversion line 1, are positioned together by an air loading pressure established by a pilot valve under the control of the pointer 24 of the liquid level device 23.

Figure 3:
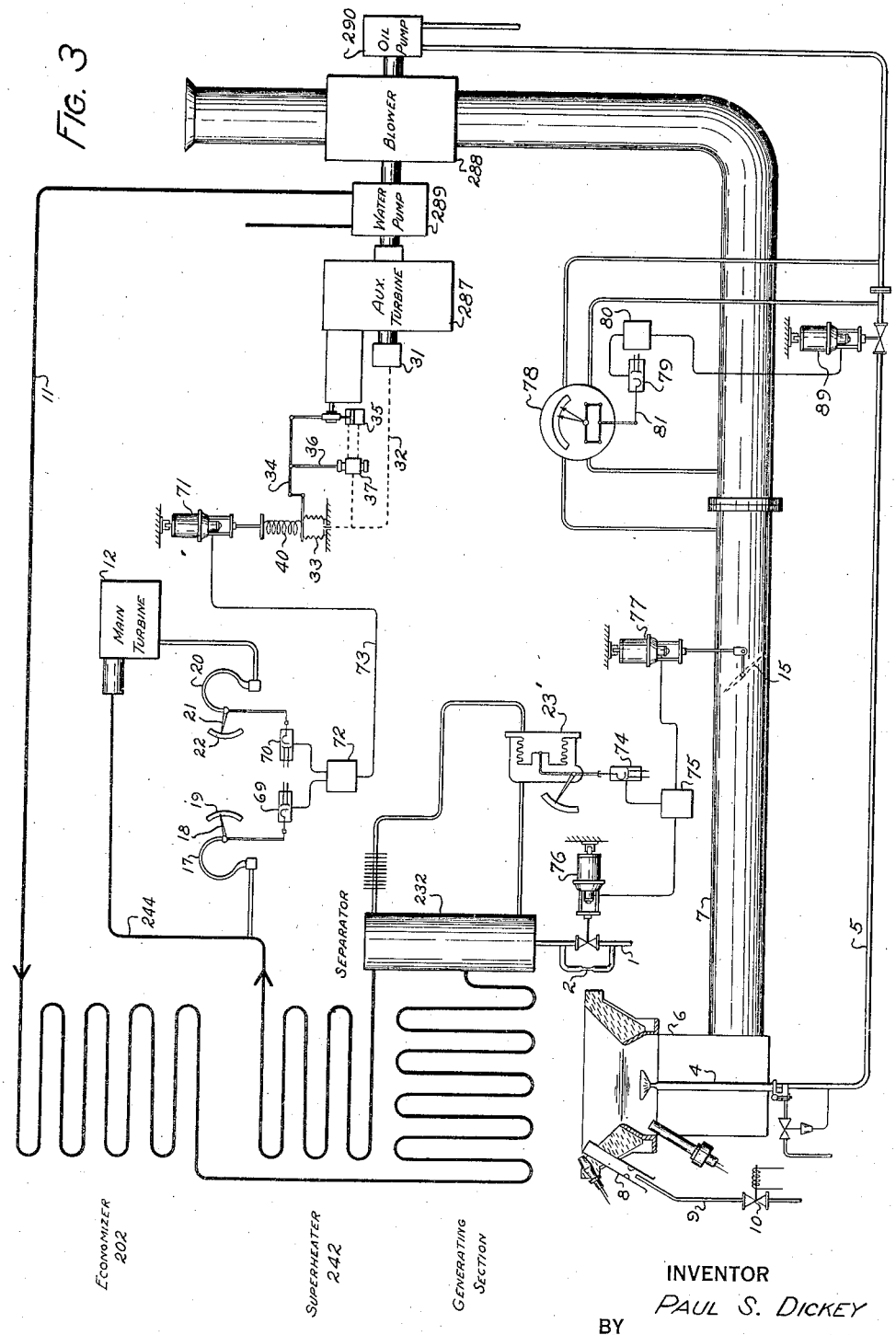
Fig. 3 is in general similar to Fig. 2 but comprising different apparatus for performing the method.

In Fig. 3 I illustrate an embodiment of my invention wherein I utilize electric means for carrying out the method, rather than the air actuated apparatus which I have described in connection with Fig. 2.

The indicator 18 is adapted to position a variable area electrode of an electron discharge device 69, and the indicator 21 is adapted to position a variable area electrode of an electron discharge device 70, the two cooperating to control the positioning of an actuator 71 for loading the governor spring 40. In the drawing, a single line connects the device 69 with a relay panel 72, and a single line connects the device 70 with the same relay panel. From the relay panel 72 a conductor 73 joins the actuator 71.

The level responsive device 23' positions the movable electrode of an electron discharge device 74 electrically connected to a relay panel 75 from which conductors lead to an actuator 76 and to an actuator 77.

The ratio meter 78 combines the functions of the meters 14, 16 of Fig. 2 to compare the rate of fuel flow and the rate of air flow and, upon departure from predetermined relation between the two, is adapted to move the movable electrode of an electron discharge device 79 connected to a relay panel 80 and to the actuator 89 of the fuel control valve 13. The conductors, of which 73 is representative, are meant to be cables which may have one or more wires, but the cables are shown as a single line to simplify the drawings.

Figure 7:
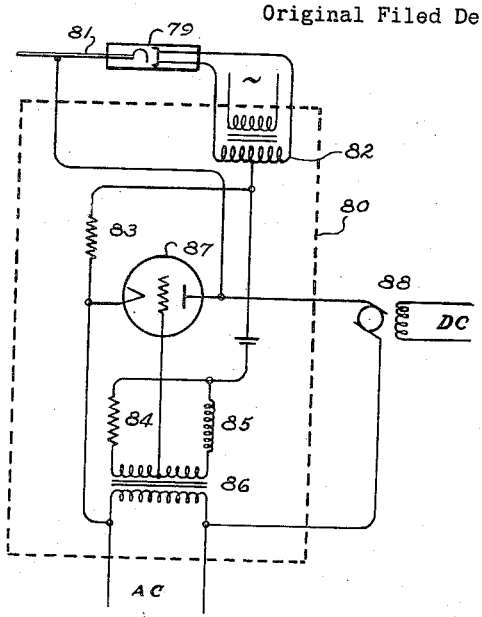
Figs. 7 and 8 are wiring details relating to Fig. 3.

Referring now to Fig. 7, I show the detailed wiring of a relay panel such as 75 and 80. Taking the panel 80 as representative and referring to Fig. 7, it will be observed that the arm 81, positioned by the ratio meter 78, is adapted to move the anode of the electron discharge device 79 relative to the cathode. In connection with the construction of such an electron discharge device reference is made to the copending application of Elmer D. McArthur, Serial No. 23,194, filed May 24, 1935, and in connection with certain circuits including such a device, reference is made to the patent to John D. Ryder, No. 2,112,682.

The cathode of the device 79 is connected to the secondary of a heating transformer 82. 83 and 84 are resistances, 85 is an inductance, 86 is a transformer, 87 an electron discharge device, and 88 a motor. The general purpose of the electron discharge device 87 is to control a flow of pulsating direct-current for speed control of motor 88, which rotates in a single direction from zero to maximum speed dependent upon the current passage of the device 87.

The control of such current passage is through controlling the percentage of time of which the device 87 is allowed to conduct, and this by impressing upon the grid of the device 87 the sum of an AC and DC voltage. The AC voltage lagging in phase with respect to the plate voltage through the action of a phase shifting bridge 84, 85, 86 and therefore the point in the cycle at which the grid voltage reaches the threshold value, and allows the device 87 to conduct, may be varied by varying the magnitude of the DC voltage which is in series with the AC voltage. Such variation in magnitude of the DC voltage is accomplished through varying the effective area of the anode of the device 79 by mechanically moving the arm 81. Thus the speed of rotation of the motor 88, forming a part of the actuator 89, is varied through the positioning of the arm 81 by the ratio meter 78.

Figure 8:
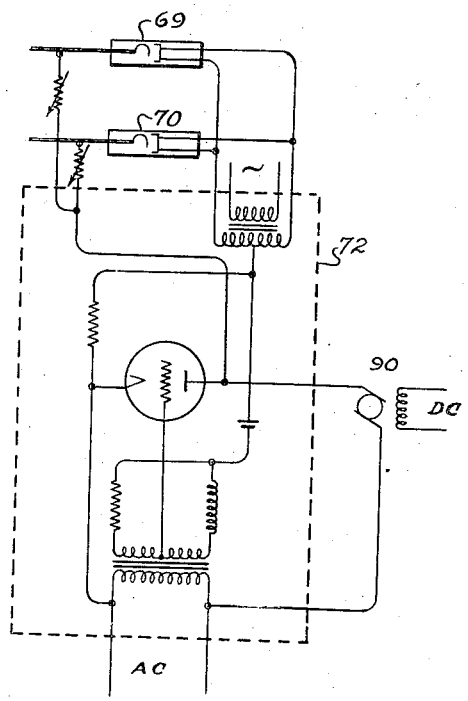

Fig. 8 illustrates the arrangement of relay panel 72 in connection with the electron discharge devices 69 and 70 which are connected in parallel to control the motor of an actuator 71 jointly in response to vapor outflow pressure and main turbine shell pressure.

Figure 9:
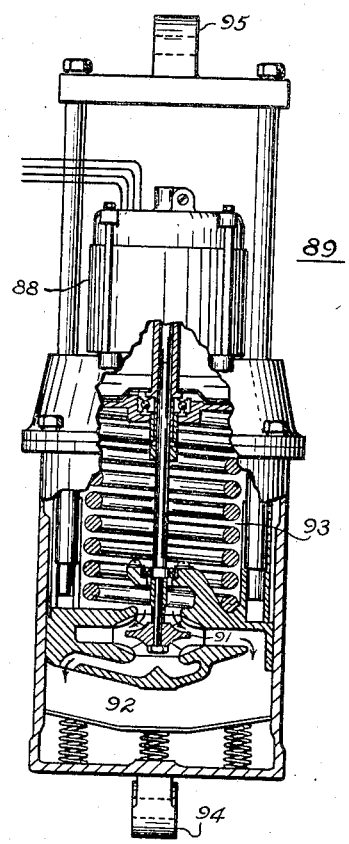
Fig. 9 is a sectional elevation of an operating mechanism of Fig. 3.

At Fig. 9 I illustrate a vertical elevation partially sectioned of the actuator 89, which is typical of the actuators 71, 76, 77, and 89 of Fig. 3. The motor 88 is the motor of the same number of Fig. 7 and is adapted to rotate in a single direction from zero to maximum speed and at a speed varying with the current impressed across its armature, as clearly indicated in Figs. 7 and 8.

Rotation of the armature drives a fluid pump 91 for forcing a fluid such as oil from the chamber 93, above the piston including the pump 91, to the chamber 92 below the piston. Such a transfer of fluid from one side of the piston to the other tends to move the piston upwardly and such motion is opposed by a compression spring in a manner clearly indicated. The pressure which is opposed by the spring varies with the speed of the motor 88 and if one end of the device, for example, as at 94, is pivotally supported in a relatively fixed manner, then a change in the speed of the motor 88 results in a movement of the end 95 relatively toward or away from the end 94 and such movement, if applied to a valve or other device to be positioned, results in a positioning of said device.

It will, of course, be observed that by changing the direction of rotation of the pump 91 the spring opposing motion may be in tension rather than in compression. Furthermore such spring loading may be external of the device rather than internal.

While I have chosen to illustrate and describe certain preferred embodiments of my invention, it is to be understood that this is by way of illustration only and that I am not to be limited thereby except as to the claims in view of prior art.

What I claim as new, and desire to secure by Letters Patent of the United States, is:

1. The method of operating a vapor generator of the drumless forced flow type having a separator between the generating and superheating portions of the fluid flow path which includes, normally controlling liquid inflow and the elements of combustion in accordance with conjointly related indications of vapor outflow and vapor outflow pressure, and readjusting the supply of air for combustion from level of liquid in the separator.

2. The method of operating a vapor generator of the drumless forced flow type having a separator between the generating and superheating portions of the fluid flow path which includes, normally controlling liquid inflow and the elements of combustion in accordance with conjointly related indications of vapor outflow and vapor outflow pressure, and utilizing level of liquid in the separator to readjust the supply of air for combustion and to control liquid level in the separator.

3. The method of controlling the operation of a vapor generator of the drumless forced flow type receiving liquid under pressure at one end and delivering superheated vapor only at the other, which includes, normally controlling liquid inflow and the elements of combustion responsive to load conditions on the generator, continuously diverting liquid from the fluid flow path adjacent the division zone between liquid and vapor, and readjusting the supply of air for combustion and maintaining the division zone at a predetermined location both in accordance with departure of the division zone from predetermined location.

4. The method of operating a vapor generator of the drumless forced flow type having a separator between the generating and superheating portions of the fluid flow path which includes, normally controlling liquid inflow in excess over vapor outflow, continuously diverting excess liquid from the fluid flow path intermediate the ends thereof, regulating the supply of fuel and air for combustion from indication of load on the generator, indicating liquid level in the separator, and utilizing such liquid level indication to readjust the supply of air for combustion and to control additional diversion of liquid from the separator.

5. The method of operating a vapor generator of the drumless forced flow type having a separator between the generating and superheating portions of the fluid flow path, which includes the steps of, controlling liquid inflow and the supply of fuel and air for combustion responsive to vapor outflow and vapor outflow pressure; readjusting air supply and liquid level in the separator from liquid level in the separator; and readjusting fuel to maintain desirable air flow-fuel relation.

6. The combination with a vapor generator of the drumless forced flow type receiving liquid under pressure at one end and delivering superheated vapor at the other, a separator between the generating and superheating portions of the fluid flow path, a level responsive meter for the separator, and regulating means for air supplied for combustion controlled by said meter.

7. The combination with a vapor generator of the drumless forced flow type receiving liquid under pressure at one end and delivering superheated vapor at the other, a separator between the generating and superheating portions of the fluid flow path, and means including electron discharge devices and responsive to liquid level within the separator for controlling liquid level within the separator and air supplied for combustion.

8. The combination with a vapor generator of the drumless forced flow type receiving liquid under pressure at one end and delivering superheated vapor at the other, a separator between the generating and superheating portions of the fluid flow path, and control means responsive to liquid level within the separator for controlling liquid level within the separator and air supplied for combustion.

9. The combination with a vapor generator of the drumless forced flow type receiving liquid under pressure at one end and delivering superheated vapor at the other, a separator between the generating and superheating portions of the fluid flow path, a level responsive meter for the separator, and regulating means including electron discharge devices and responsive to said meter for controlling air supplied for combustion.

10. The method of operating a vapor generator of the drumless forced flow type having a separator between the generating and superheating portions of the fluid flow path, which includes the steps of, controlling liquid inflow and the supply of fuel and air for combustion responsive to vapor outflow and vapor outflow pressure; readjusting air supply from liquid level in the separator; and readjusting fuel to maintain desirable air flow-fuel flow relation.

11. The method of operating a vapor generator of the drumless forced flow type having a separator between the generating and superheating portions of the fluid flow path, which includes the steps of, controlling liquid inflow and the supply of air and fuel for combustion responsive to load conditions on the generator; readjusting air supply from liquid level in the separator; and readjusting fuel to maintain desirable air flow-fuel flow relation.

12. The combination with a vapor generator of the drumless forced flow type receiving liquid under pressure at one end and delivering superheated vapor at the other, a separator between the generating and superheating portions of the fluid flow path, means positioned in accordance with vapor outflow, means positioned in accordance with vapor outflow pressure, and means for simultaneously controlling liquid inflow and the supply of fuel and air for combustion responsive to said first and second named means; means responsive to liquid level in the separator and adapted to readjust air supply; and means adapted to readjust the control of fuel to maintain the desirable air flow-fuel flow relation.

13. The combination with a vapor generator of the drumless forced flow type receiving liquid under pressure at one end and delivering superheated vapor at the other, a separator between the generating and superheating portions of the fluid flow path, a level responsive meter for the separator, means positioned responsive to load on the generator, means positioned responsive to vapor outflow pressure, means adapted to simultaneously control liquid inflow and the supply of fuel and air for combustion responsive to said first and second named means; means responsive to said level meter and adapted to readjust the air supply; and means adapted to readjust fuel to maintain desirable air flow-fuel flow relation.

14. The combination with a vapor generator of the drumless forced flow type receiving liquid under pressure at one end and delivering superheated vapor at the other, a separator between the generating and superheating portions of the fluid flow path, a level responsive meter for the separator, means for continuously indicating the value of vapor outflow, means continuously indicating the value of vapor outflow pressure, means conjointly under the control of said indicating means for continuously regulating liquid inflow and the elements of combustion, and means responsive to said level meter for continuously readjusting the supply of air for combustion.

15. The combination with a vapor generator of the drumless forced flow type receiving liquid under pressure at one end and delivering superheated vapor at the other, a separator between the generating and superheating portions of the fluid flow path, a level responsive meter for the generator, means responsive to load conditions on the generator, means adapted to continuously control liquid inflow and the supply of the elements of combustion responsive to said load indications, and means adapted to readjust the supply of air for combustion and to control level within the separator both responsive to said level meter.

16. The combination with a vapor generator of the drumless forced flow type receiving liquid under pressure at one end and delivering superheated vapor at the other, a separator between the generating and superheating portions of the fluid flow path, a hydraulic actuator for controlling liquid level within the separator, a second hydraulic actuator for controlling air supplied for combustion, and means including electron discharge devices and responsive to said level meter for controlling said actuators.

17. The combination with a vapor generator of the drumless forced flow type receiving liquid under pressure at one end in excess over delivered superheated vapor at the other, a separator between the generating and superheating portions of the fluid flow path, means for continuously diverting excess liquid from the fluid flow path adjacent the division zone between liquid and vapor, a level responsive meter for the separator, and regulating means for additional divergence of liquid from the fluid flow path controlled by said meter.

18. The method of operating a vapor generator having a small liquid storage with a high rate of evaporation to which liquid is supplied in excess to vapor outflow and heated by the elements of combustion, which includes the steps of normally continuously diverting excess liquid from adjacent the division zone between liquid and vapor, and maintaining the location of said division zone through additional diversion of liquid.

19. In combination with a vapor generator, an auxiliary power means driving fuel, air, and liquid supply means for the generator, and means responsive to an indication of generator load for normally controlling speed of said auxiliary power means.

20. In combination with a vapor generator, an auxiliary turbine driving fuel, air, and liquid supply means for the generator, means indicating generator load, means indicating vapor outflow pressure, and means continuously controlling speed of said auxiliary turbine conjointly responsive to both said means.

21. In combination with a vapor generator, an auxiliary turbine driving fuel, air, and liquid supply means for the generator, speed representative means of auxiliary turbine speed, means adapted to maintain auxiliary turbine speed roughly proportional to load on the generator, and means responsive to said speed representative means for readjusting said auxiliary turbine speed.

22. In combination with a vapor generator, an auxiliary turbine driving fuel, air, and liquid supply means for the generator, means continuously producing a fluid loading pressure representative of turbine speed, means continuously producing a fluid loading pressure representative of generator load, and means under the joint control of said loading pressures adapted to control turbine speed.

23. The method of controlling the operation of a vapor generator of the drumless forced flow type to which liquid is supplied in excess to vapor outflow and having a separator between the generating and superheating portions of the fluid flow path which includes, continuously diverting excess liquid from the separator, and utilizing liquid level in the separator to control additional diversion.

PAUL S. DICKEY.